US005251222A

United States Patent [19]

Hester et al.

[11] Patent Number: 5,251,222

[45] Date of Patent: Oct. 5, 1993

[54] ACTIVE MULTI-STAGE CAVITY SENSOR

[75] Inventors: Charles F. Hester; Steven M. Burke, both of Huntsville, Ala.

[73] Assignee: Teledyne Industries, Inc., Los Angeles, Calif.

[21] Appl. No.: 843,071

[22] Filed: Mar. 2, 1992

Related U.S. Application Data

[63] Continuation-in-part of Ser. No. 678,706, Apr. 1, 1991.

[51] Int. Cl.[5] .......... H01S 3/10

[52] U.S. Cl. .......... 372/26; 372/92; 372/99; 372/101; 372/103

[58] Field of Search .......... 372/107, 99, 33, 92, 372/26, 29, 109, 101, 103

[56] References Cited

U.S. PATENT DOCUMENTS 4,700,368 11/1987 Fukuda et al. .......... 372/99
4,715,689 12/1987 O'Meara et al. .......... 372/99
4,720,176 1/1988 Klein et al. .......... 372/99
5,038,359 8/1991 Pepper et al. .......... 372/99

*Primary Examiner*—Leon Scott, Jr.
*Attorney, Agent, or Firm*—Beveridge, DeGrandi, Weilacher & Young

[57] ABSTRACT

In accordance with the present invention, an optical sensing device and method are provided for processing with extremely low energy requirements. Spontaneous emissions from an excited optical gain medium generate a propagating waveform. Either a spatial modulator or the pattern under investigation modulates the optical wavefront generated by the fluorescing gain medium to impose a first spatial pattern thereon. When the first spatial pattern imposed on the wavefront has duality with another spatial pattern imposed by the other of the pattern under investigation or the SLM, light is directed back along pathways through a cavity defined by the gain medium, a reflector, the SLM, and the object under investigation to induce stimulated emission and eventually resonance in the cavity.

15 Claims, 7 Drawing Sheets

ACTIVE MULTI-STAGE CAVITY SENSOR

This application is a continuation-in-part of U.S. application Ser. No. 07/678,706 filed on Apr. 1, 1991 now allowed.

BACKGROUND OF THE INVENTION

The present invention relates to an extremely low energy optical processor and a method of optical processing. More particularly the processor of the present invention comprises an optical cavity defined by an optical gain medium excitable to population inversion, first and second means for imposing spatial patterns on wavefronts generated by the gain medium, and reflective means for reflecting light back to the gain medium to induce stimulated emission therein when the spatial patterns imposed by each of the first and second means have dual spatial patterns.

The present invention also relates to an active optical sensor and a method of optical sensing or pattern recognition wherein an optical cavity is defined by a gain medium, an object under investigation, a spatial light modulator, and a reflective means for reflecting light back to the gain medium to induce stimulated emission therein when spatial patterns imposed by the object and the spatial light modulator have duality.

Prior art optical computers have utilized coherent light provided from laser light sources which are external to the computation system. The externally-provided light is used for making the desired computations. Light from the external source is fed into the system and thereafter the computations are performed. Well known optical computing devices such as coherent optical correlators are examples of such prior art systems. Diffraction of laser light is exploited to compute Fourier transforms, correlations, convolutions, and to perform general transformations through the interconnections provided by the externally-generated light.

Where the laser source is external, it is held or pulsed at substantially full lasing power and the "lasing" photons are sent to the full computation path. Power requirements for operating such prior art systems thus depend upon the total computation power requirements and "laser beam waves". Power requirements are heavily dependent upon the size of the system. For example, power requirements for prior art laser-based, active sensors are larger because gain is provided external to the elements accomplishing detection and computation. In such prior art laser active sensors, full laser power is generated for illuminating the object under observation. Special detection by heterodyning and subsequent post processing are state of the art for known active sensors.

Intra-cavity modulation has been used in mode-locked and Q-pulsed laser systems. Such devices have been employed in for example, communications, radar systems, weaponry systems and other applications. For example, U.S. Pat. No. 4,658,146 relates to a laser apparatus with an extended cavity in which an information bearing medium intercepts a standing wave generated within the laser cavity. The system of U.S. Pat. No. 4,658,146 is described as switching in and out of lasing mode operation as the surface of the information bearing medium is moved to bring changing magnetic domains. As such, information encoded as the timing between domain changes can be recovered by monitoring laser operation or nonoperation.

U.S. Pat. No. 3,657,510 relates to a Q-switched laser for vaporizing or otherwise altering the surface of a target object according to a given pattern. In this regard, U.S. Pat. No. 3,657,510 discloses a laser cavity which is defined between a full mirror and a partial mirror, and which includes a laser medium, a Q-switch, and a mask. A laser medium is pumped into stimulated emission. According to U.S. Pat. No. 3,57,510, the stimulated emission occurs only at cross-sectional portions of the laser material that correspond to the pattern of the mask, whereby the resulting laser beam has a cross-section corresponding to the pattern when it strikes the surface of the target object.

SUMMARY OF THE INVENTION

An extremely low energy optical cavity processor and method of optical processing are provided in accordance with the present invention. In accordance with the present invention, the necessary energy requirements for processing or computation are low as the optical gain medium in the system of the invention need be excited only to the extent that it begins to fluoresce. Then, the presence or absence of resonant conditions within a cavity containing such gain medium provides the results of various different types of computations which include, but are not limited to, pattern recognition, correlation, convolution, and various transformations.

The gain medium which when excited into a state of population inversion generates a wavefront which propagates along an optical path within the cavity. That is, the gain medium is excited to fluorescence conditions. Two separated elements also are present within the cavity for "perturbing" or imposing spatial patterns on the wavefront generated by the fluorescing gain medium. A first spatial modulating element imposes a first spatial pattern on the wavefront generated by the gain medium. The light pattern resulting from perturbation of the wavefront by the first modulating element can be thought of as a computational layer. Thereafter, a second modulating element, also disposed within the optical path, imposes a second spatial pattern on the wavefront having the first spatial pattern imposed thereon by the first modulating element.

Reflecting means are also provided to define the optical cavity with the gain medium, the first spatial modulating element, and the second spatial modulating element. When the pattern imposed by the first spatial modulating element has a spatial pattern possessing duality with the light pattern imposed by the second spatial modulating element, the reflecting means reflects light back through the optical train along distinct paths defined by the two spatial modulating elements. Any reflected photons thereafter will induce stimulated emission in the gain medium. Thus, the perturbed wavefront produced by transmission through an optical train defined by the gain medium, spatial modulating elements, and reflecting means results in a light pattern formed by reinforcement and cancellation of perturbed wavefronts. Where the spatial modulating elements are embodied by two spaced-apart spatial light modulators, a successful transit by spontaneously emitted photons through the optical train, and back to the gain medium to generate stimulated emission, defines a correlation path through the optical cavity. The extent of stimulated emission induced in the gain medium is proportional to the number of photons which successfully traverse optical paths through the cavity. Successfully traversing photons induce stimulated emissions in the gain material as they traverse the same paths, whereby resonant modes build in the cavity. Resonance within the cavity can be detected by optical coupling means such a photodetector arrangement placed in communication with the cavity. Alternatively, resonance may be detected by monitoring current and/or voltage characteristics across the gain medium.

In the preferred embodiments, the first modulating element comprises a two dimensional spatial light modulator. The second modulating element can comprise a transmissive spatial light modulator. Alternatively, the second modulating element could comprise a phase conjugate reflecting means formed of individual phase conjugate mirrors mounted so as to impose a second spatial pattern on the wavefront emerging from the first spatial light modulator. Where both the first and second spatial modulating elements comprise transmissive spatial light modulators, as described in connection with one of the preferred embodiments, two mirror means are all that is required to define the boundaries of the optical cavity. Preferably these mirror means comprise a phase conjugate mirror.

It is contemplated that a shutter also could be provided within the cavity for selectively opening and closing the optical train. The shutter could be provided by another spatial light modulator, or any birefringent, magnet-optic, acousto-optic, photorefractive, photochromic or electro-optic device for quickly switching between open and closed conditions. In the preferred embodiments, the shutter is open for a minimum time required for the detection of resonance within the cavity. One this detection is made, the shutter can be closed.

In accordance with the present invention a low energy optical processing apparatus comprises: (a) a gain medium excitable into a state of population inversion to spontaneously emit photons along an optical path to generate a wavefront; (b) first means, disposed within the optical path for imposing a first spatial pattern on a wavefront generated by the gain medium; (c) second means, disposed within the path, for imposing a second spatial pattern on a wavefront having a first spatial pattern imposed thereon by the first means; and (d) means, defining an optical cavity with the gain medium, the first means and the second means, for reflecting light back to the gain medium along the optical path to induce stimulated emission in the medium when the first spatial pattern and the second spatial pattern possess duality.

Further in accordance with the present invention, an extremely low energy processing method utilizing an optical cavity defined by a gain medium and two reflective means comprises the steps means of: (a) exciting the gain medium into a state of population inversion so that medium spontaneously emits photons to generate a wavefront propagating along an optical path within the cavity; (b) in the cavity, imposing a first spatial pattern on the wavefront to provide a patterned wavefront; (c) in the cavity, imposing a second spatial pattern on the patterned wavefront; and (d) detecting in the gain medium, the presence or absence of stimulated emission induced by light reflected from one of the reflective means.

An optical sensor apparatus for recognizing a pattern in a view volume in accordance with the present invention comprises: a gain medium excitable into a state of population inversion to spontaneously emit light which forms a wavefront capable of being spatially modulated by the pattern in the view volume to impose a spatial pattern on the wavefront; reflective means disposed to reflect light propagating from the gain medium back to the medium; spatial light modulating means which modulates light incident thereon according to a characteristic spatial pattern for defining a cavity capable of resonance conditions with the gain medium, the reflective means, and the pattern in the view volume when the spatial pattern imposed by the pattern in the view volume correlates with the characteristic spatial pattern, whereby stimulated emission is induced in the gain medium.

A method of recognizing a pattern in a view volume by utilizing a gain medium, reflective means and a spatial light modulating means in accordance with the present invention comprises the steps of: (a) exciting the gain medium into a state of population inversion to induce fluorescence in the medium to thereby generate a wavefront capable of being spatially modulated; spatially modulating the wavefront by one of the spatial light modulating means or the pattern to provide a modulated wavefront; spatially modulating the modulated wavefront by the other of the spatial light modulating means or the pattern; causing any light resulting from spatial modulation of the modulated wavefront to be directed back to the gain medium by the reflective means; and detecting whether stimulated emission is induced in the gain medium in response to light directed thereto by the reflective means.

BRIEF DESCRIPTION OF THE DRAWINGS

Further aspects and features of the present invention will be even more apparent from the following detailed description and drawings, and the appended claims. In the drawings:

DETAILED DESCRIPTION OF THE PREFERRED EMBODIMENTS

Figure 1:
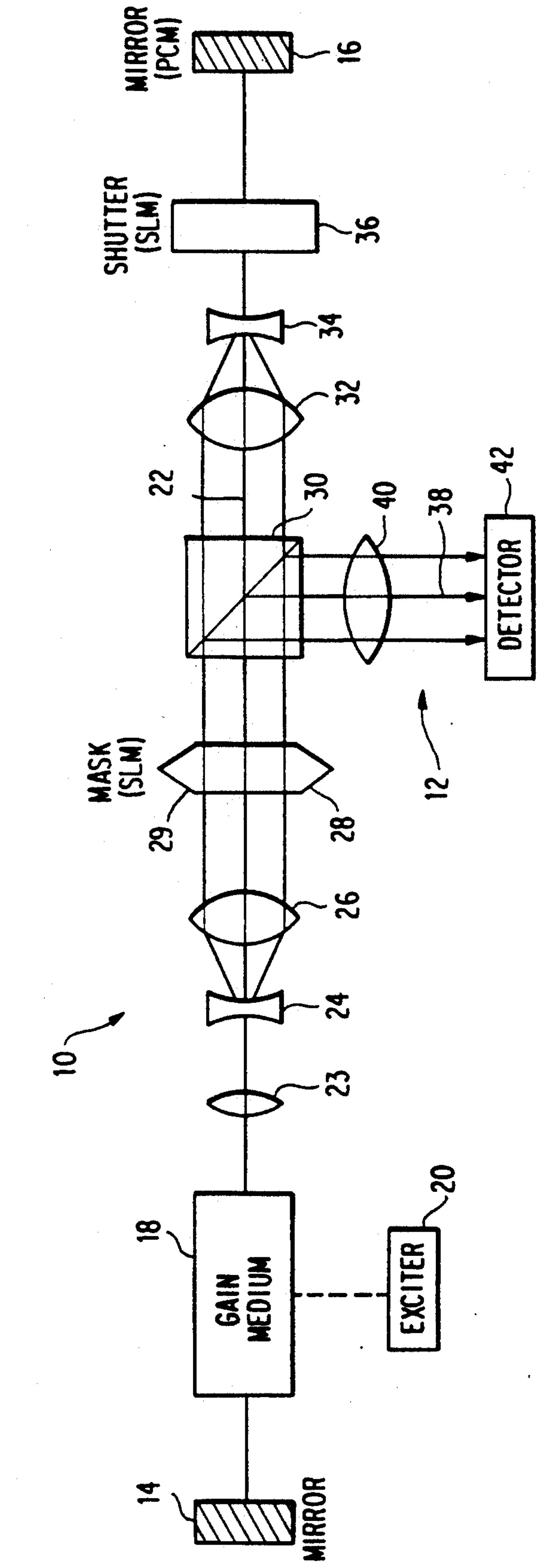
FIG. 1 is a schematic diagram of a preferred embodiment of an optical processor according to the present invention.

FIG. 1 is a block diagram showing a first embodiment of the low energy processor in accordance with the present invention. In FIG. 1, processor 10 is shown in conjunction with a photodetection arrangement 12. Preferred processor 10 is completely implemented by optical elements. As shown, processor 10 comprises a resonance cavity defined by mirrors 14 and 16 and a gain medium 18. Any suitable pumping or exciting means 20 is provided for energizing the gain medium 18 and so the exciter is chosen according to what type of lasing medium is utilized in processor 10. Exciter 20 excites the gain medium 18 into a pre-lasing state of population inversion. Preferably, the gain medium is excited to the extent that it just begins spontaneously emitting radiation, i.e. fluorescence.

Gain element 18 can comprise any conventional lasing cell. Solid state laser diodes are preferable due to their high efficiency, small size, and broad band output. However, it is contemplated that many other lasing materials can be used.

In the embodiment of FIG. 1, mirrors 14 and 16 are each fully reflecting. However, as will be understood, the placement of photodetection arrangement 12 is arbitrary and FIG. 1 merely shows one possible position for the photodetection arrangement. For example, as an alternative, mirror 16 could be made to have less-than-unity reflectivity and the photodetection arrangement therefore could be disposed behind such a partially reflective mirror. Indeed, it will be understood that processor 10 does not require a photodetection arrangement to actually perform any of its computations, and arrangement 12 is necessary only for interface with the outside world.

The resonance cavity of processor 10 has an optical axis which, for convenience, is identified by reference numeral 22. A first lens 23 focuses spontaneously emitted light through a lens unit comprising a concave lens 24 and a convex lens 26 along optical axis 22 onto a mask 28 which provides the computational algorithm under operation. It will be appreciated that as used in connection with the present invention, the term "computation" refers to any of numerous operations which could be performed by the disclosed processor 10. Such computations include but are not limited to pattern recognition, correlation, convolution, and transformations.

Light emerging from mask 28 passes through a beam splitter B/S 30 to a like lens unit comprising a convex lens 32 and a concave lens 34. A shutter 36 is provided between concave lens 34 and mirror 16. The positions of lenses 24, 26, 32, and 34 within the resonance cavity are arbitrary. These lenses do not affect the computations performed by processor 20 and are present only to adjust the beam by expanding or reducing the beam width in accordance with the dimensionality and size of mask 28. Gain medium 18 and lens 23 may be positioned within the cavity in any order. The position of the shutter 36 likewise is arbitrary in the cavity. If desired, additional mirrors and lenses could be used to fold or bend the cavity according to a given linear dimension without affecting the capabilities of processor 10.

A portion of the light passing through mask 28 is directed to the photodetection arrangement 12 by beam splitter 30. Beamsplitter 30 may have, for example, 98% transmittivity along optical axis 22 and have 2% reflectivity along transverse optical axis 38. As shown in FIG. 1, photodetection arrangement 12 comprises a lens 40 and a photodetector 42 for sampling output from processor 10. Conventional photomultiplier tubes, avalanche diodes and the like will suffice as the photodetector 42. Very high sensitivity is important in sensing the contemplated low level light output.

In the preferred embodiments, mask 28 comprises a transmissive spatial light modulator SLM 29. In the embodiment of FIG. 1, the spatial light modulator 29 providing mask 28 is considered to be two-dimensional. However, as is appreciated by one of ordinary skill in the art, the SLM embodying mask 28 could be one-dimensional, or could be considered to approximate a point. Appropriate relaying lenses can be positioned within the optical cavity to accommodate different dimensionalities of the SLM forming mask 28. It is also appreciated that while a transmissive spatial light modulator provides mask 28 in the embodiment of FIG. 1, a reflective SLM likewise would be suitable. Further still, mask 28 could comprise magneto-optic, acousto-optic, or electro-optic devices or devices comprising birefringent, photorefractive, or photochromatic materials, frequency-controlled non-linear devices, or holographic memory elements. Shutter 36, like mask 28, also could comprise any spatial light modulating device.

Processor 10 could be thought of as performing computations encoded by mask 28 while shutter 36 is closed. As soon as the gain medium 18 is excited, a portion of the spontaneous photons emitted from the medium acquire the information of mask 28. Mask 28 continuously perturbs wavefronts defined by spontaneously emitted photons along axis 22 to produce a perturbed or encoded wavefront. When shutter 36 is opened, the perturbed wavefronts pass through beamsplitter 30, and shutter 36 along optical axis 22 to mirror 16.

Figure 2:
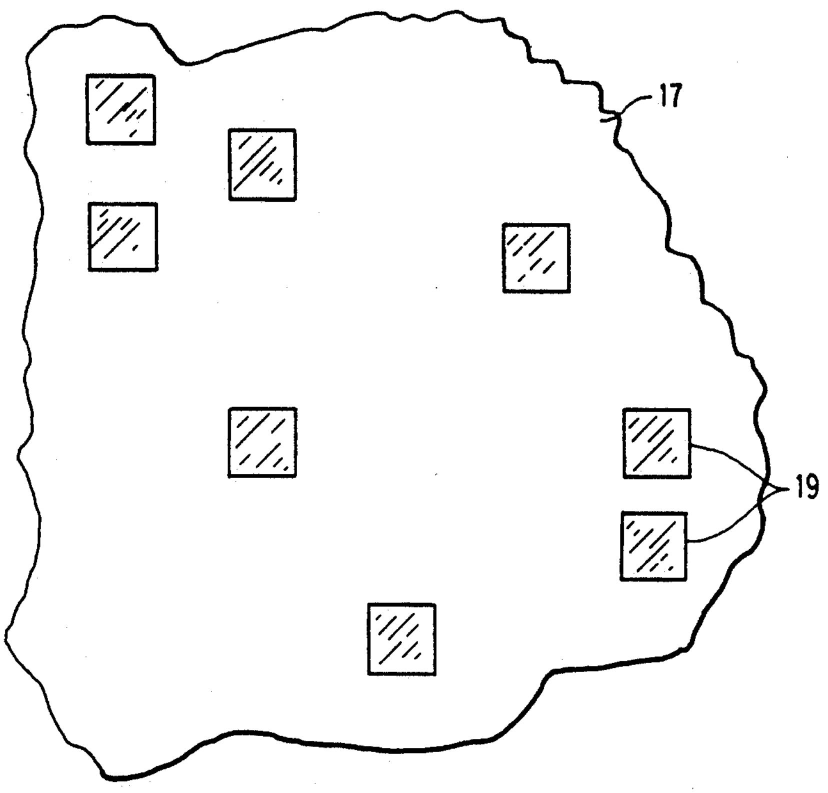
FIG. 2 is a schematic illustration of a phase conjugate mirror means suitable for use in the embodiment of FIG. 1.

With reference to FIG. 2, a portion of preferred mirror 16 is illustrated as comprising an array of independent, small reflecting members 19 which each comprise a phase conjugate material. Accordingly, mirror 16 hereinafter will be referred to as phase conjugate mirror PCM 17. Reflecting members 19 are positioned to most strongly reflect a particular or characteristic spatial pattern or patterns. PCM 17 thus time-reverse reflects particular wavefront patterns incident thereon in dependence upon how closely the incident wavefront matches the characteristic pattern or patterns of the PCM. Incident wavefront patterns which differ substantially from the characteristic pattern of PCM 17 will be only weakly reflected or not reflected by the PCM.

It follows that when shutter 36 is opened, if the perturbed wavefront formed by mask 28 substantially matches a characteristic wavefront pattern of PCM 17, photons defining the perturbed wavefront pattern will be time-reverse reflected back through the open shutter by the PCM. Light reflected by PCM 16 can be considered as carrying the results of computation back along optical axis 22 to the gain medium 18 to cause amplification in the medium. Gain medium 18 interacts with the perturbed wavefront reflected by PCM 17 as the reflected wavefront passes through the medium, generally along optical axis 22. Thus, the time-reversed, reflected perturbed wavefront interacts with the gain medium 18 to produce gain or increased stimulated emissions having the same propagation characteristics. This intensity amplified wavefront is reflected by full mirror 14 back through the gain medium to be further amplified with each subsequent reflection. Such amplification continues in the cavity as long as shutter 36 remains open. Preferably shutter 36 remains open for a minimum period permitting resonance within the cavity of processor 10. Resonant operation is desirable because it provides for increased response to wavefront perturbations by mask 28, increased stimulated emissions, and relative decrease of noise in the gain medium. Such matching of the known characteristic pattern and the characteristic pattern under test to produce cavity resonance is also referred to as duality. "Duality" between the known pattern and pattern under test is said to occur when the pattern under test is the resonant conjugate of the known pattern, i.e. the pattern to be matched.

Figure 3A:
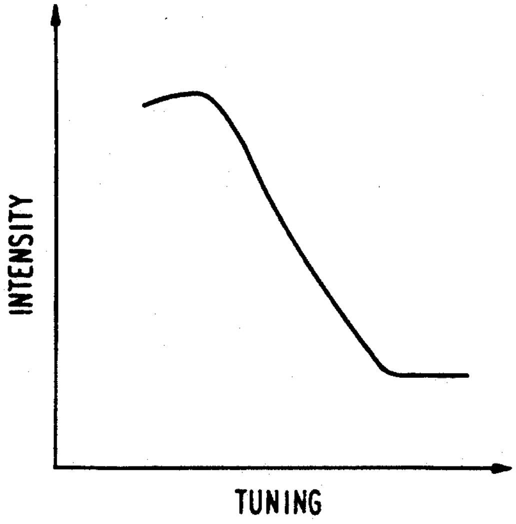
FIGS. 3A and 3B are graphical representations useful in understanding intensity response as a function of tuning.
Figure 3B:
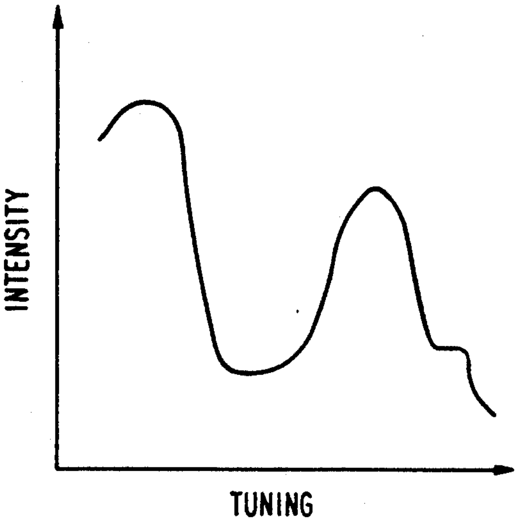
Figure 4:
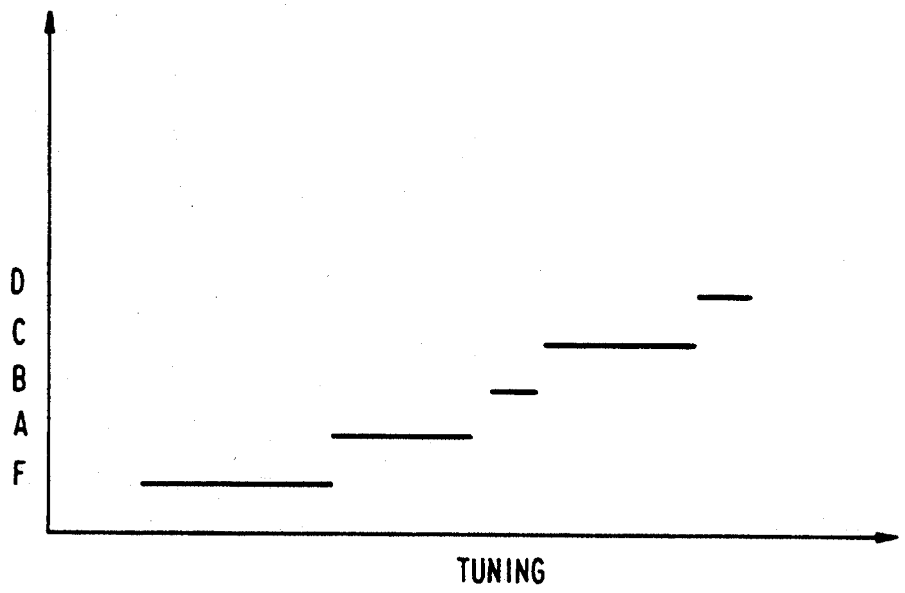
FIG. 4 is a graphical depiction of spectral line selection as a function of tuning.

For operation, it is contemplated that the cavity is tuned to have a stability point at which it produces a single frequency in the absence of perturbing mask 28. Different stability points can be selected depending upon the different wavelengths and amplitudes at which the gain media lases. The stability point could be made to reside in the fundamental mode, or alternatively, in some non-fundamental mode. As noted from FIGS. 3(A) and 3(B), such stability point may reside within linear or nonlinear regions of intensity response to perturbation magnitude. A tuned or neutral stability point can be maintained by mode-locking or by electromechanical elements as appreciated by those of ordinary skill in the art. Verification of the cavity stability point can be made by spectral line analysis and/or amplitude response. FIG. 4 depicts spectral line selection as a function of tuning. Also, as is appreciated, changing spectral lines usually results in significant changes in output intensity. It is also kept in mind that one cavity can produce multiple lines simultaneously. When mask 28 is introduced into the optical cavity, the cavity is detuned from its selected stability point. Accordingly, it is contemplated that resonance within the cavity will occur at a frequency or frequencies different from that to which the cavity is tuned.

While shutter 36 remains open, amplified stimulated emission eventually becomes detectable by photodetection arrangement 12. Different criteria may be used in evaluating the computation results as sensed by photodetection arrangement 12. A first such evaluation method is based upon time sequence. Photon arrival statistics at detector 42 depend upon the structure of mask 28. Therefore, a time record of photon counts identifies the perturbation encoded by the mask. Thus, in operation, shutter 36 is opened to complete the optical path between mirrors 14 and 16 for a minimum amount of time necessary to achieve adequate amplification stimulated emission wherein "adequate amplification stimulated emission" is defined as the generation of statistically significant numbers of photons. As stated previously, this statistically significant condition is achieved when sustained resonance occurs within the cavity of processor 10. Thusly, lasing conditions within the cavity automatically perform thresholding for output from processor 10. Alternatively, if desired, smaller numbers of photons could provide the basis for analyzing the computation results depending upon the desired confidence level in the results.

A second output characterization relies upon emitted photon displacement transverse to the axis 22 of the optical cavity of processor 10. The lobe structure of the stimulated emission varies with the perturbation encoded by mask 28. Time records of photon arrival at each lobe zenith further can specify the output.

Thirdly, spectral classification is contemplated. Here, the amplified simulated emissions could be directed through a grating prism. Frequency components of the amplified stimulated emissions are spatially separated and again, time records of photon arrival at each band can further categorize the output.

Figure 5:
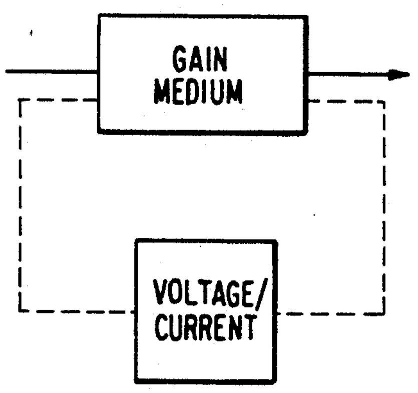
FIG. 5 is a block diagram illustrating characterization of cavity condition by monitoring voltage/current parameters in the gain medium.

Methods other than optical methods can be used for detection of resonant or nonresonant conditions within the cavity. For instance, as shown in FIG. 5, a voltage and/or current measuring device 70 can be connected across the gain medium 72 to detect internal conditions therein. The voltage across gain medium 72 varies depending upon the extent of stimulated emission induced therein by light reflected back through the cavity when the characteristic spatial patterns possess duality.

Computation by processor 10 is extremely energy efficient. Information is encoded on a perturbed wavefront, and, in the preferred embodiments, calculation and readout are accomplished by obtaining resonance in the cavity. Since resonance will occur only when the perturbed wavefront encoded by mask 28 substantially matches one of the characteristic spatial patterns of PCM 17, it is understood that gain is provided only in response to selected results which depend upon the mask. Accordingly, processor 10 operates at extremely low power because gain is needed only when shutter 36 is open to provide sufficient amplification to carry out a read operation at photodetector 40. Indeed, it may be said that gain is not required during performance of the computations by the interaction of spontaneously emitted photons with mask 28, but only during a read operation when amplification is necessary for detecting the presence or absence of a perturbed wavefront at photodetector 42.

Figure 6:
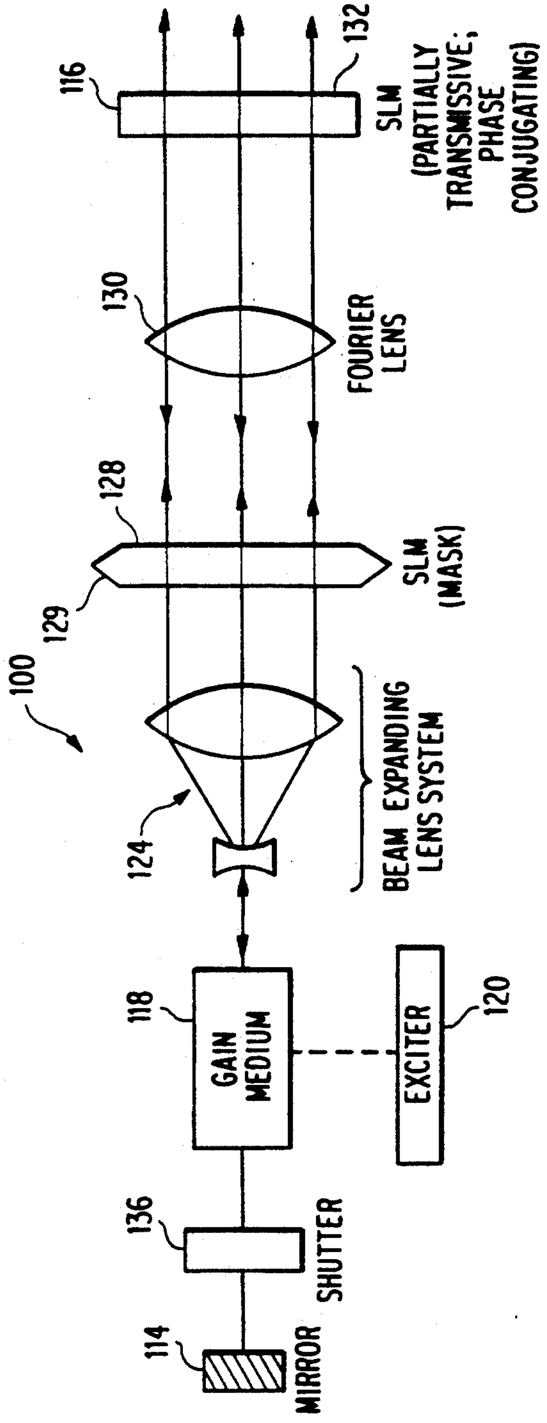
FIG. 6 is a schematic diagram of an alternate embodiment of an optical processor in accordance with the present invention provided as a linear cavity, multi-stable pattern recognition system.

Reference is made to FIG. 6 in describing an alternative embodiment of a processor in accordance with the present invention which operates as a linear-cavity, multi-stable pattern recognition system. System 100 is noted to be similar to processor 10 and to likewise includes a fully reflective rear mirror 114 and a front phase conjugate reflective element 116, which together with a gain medium 218, define an optical cavity having an optical axis 122. An exciter 120 is shown for pumping the gain medium 118 to provide a desired level of spontaneous emission. A lens system 124 appropriately adjusts the beam width in the defined optical cavity.

In the embodiment of FIG. 6, a transmissive SLM 129 likewise provides a mask 128 for encoding a particular pattern or patterns on spontaneously emitted photons from gain medium 118. A reflective SLM 132 provides the phase conjugate reflective element 116 and is programmed to most fully reflect a selected transformation pattern or patterns representative of a pattern or patterns to be recognized. Transformation of the perturbed wavefront passed by mask 128 is effected by a Fourier lens 130 disposed between the mask and SLM 132. Reflective SLM 132 sends recognized photons back along optical path 122 through the gain medium 118. When shutter 136 is open, gain by medium 118 can be sensed behind reflective SLM 132 which can be partially transmissive.

Figure 7:
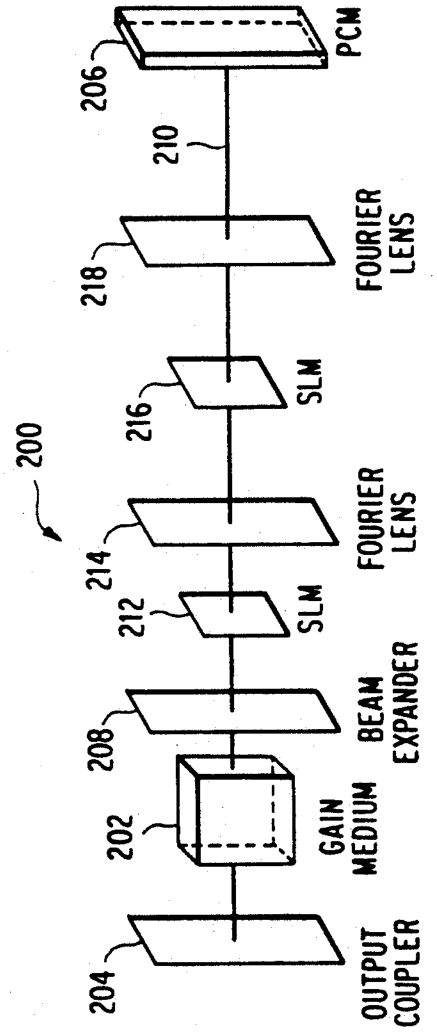
FIG. 7 is a schematic diagram of another embodiment of the optical processor according to the present invention.

FIG. 7 shows another embodiment of the processor in accordance with the present invention. In the embodiment of FIG. 7, the processor 200 has an optical cavity defined by gain medium 202, output coupler 204, and PCM 206. In processor 200, it will be understood that PCM 206 can be a solid mirrored surface. A beam expanding element 208 is disposed along the optical axis 210 defined through the gain medium 202. A transmissive SLM 212 is provided between the beam expander 208 and a Fourier lens 214 which is located one focal length away from the SLM 212. A second transmissive SLM 216 is located one focal length from each of Fourier lens 214 and a second Fourier lens 218.

In the operation of processor 200, the gain medium 202 likewise is excited into fluorescence. Spontaneous emissions from the medium are expanded by the beam expander 208 in order to illuminate SLM 212. SLM 212 imposes a spatial pattern on the illuminating light from the gain medium 202 by selectively permitting transmittance through pixels defined by the two-dimensional face of the SLM. Again, the resulting pattern of light can be thought of as a perturbed wavefront, or as a computational layer. The light pattern transmitted through SLM 212 is collected by the Fourier lens 214. Fourier lens 214 forms another light pattern which is the Fourier transform of the light pattern transmitted through SLM 212. The transformed light pattern emerging from lens 214 is imaged onto SLM 216 wherein the incident waveform is perturbed further if it propagates through the second SLM 216. It can be thought that the original transformed computational layer defined by SLM 212 and lens 214 is compared to a second computational layer defined by SLM 216. Thereafter, light transmitted through SLM 216 is collected at the second Fourier lens 218 which forms another transformed pattern that, in turn, is imaged onto PCM 206.

Transmission along optical train 200 forms a light pattern by reinforcing and cancelling perturbed wavefronts. For optical path or train 200 comprising SLMs 212, 216 and Fourier lenses 214, 218 which are located one focal length apart, photons which successively arrive at PCM 206 for reflection define a correlation path. Then, PCM 206 time-reverse reflects the incident light pattern whereby photons incident on the PCM are reflected to traverse their original paths in reverse order. As explained in the foregoing, all photons reflected by PCM 206 will propagate in paths generally along optical axis 210 to produce further stimulated emission in the gain medium 202. Up to where the gain medium 202 reaches depletion conditions, the number of stimulated emissions generated by the gain material will be proportional to the number of photons directed back to the medium by PCM 206. Photons traversing a particular correlation path through the cavity generate stimulated emissions that traverse the same path. Thus, resonant cavity modes build. Increased numbers of photons propagate back through gain medium 202 to the output coupler 204. Then, depending upon the reflectivity of the coupler 204, some percentage of photons can be allowed to be transmitted through the coupler while the remainder are reflected back along their incident path or paths to reenter the gain medium 202 and thereby produce further stimulated emissions.

Photons traversing along competing correlation paths will continue to traverse the full cavity length. As the number of photons directed through the gain medium 202 forces the medium to near depletion conditions, the number of correlation paths may decrease. Thus, as round-trip cavity gain decreases towards unity, a dominant correlation path may establish a dominant resonant mode in the cavity. However, it is contemplated that a plurality of paths may continue to exist with each such path having equal or variable field amplitudes in the corresponding cavity modes.

Figure 8:
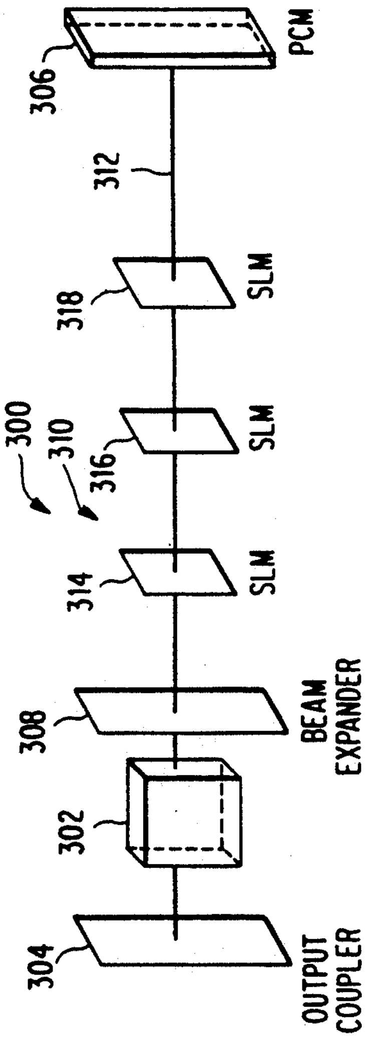
FIG. 8 is a schematic diagram of yet another embodiment of an optical processor in accordance with the present invention.

FIG. 8 shows still another embodiment similar to processor 200 shown in FIG. 7. However, in the embodiment of FIG. 7 the correlation path forming elements 212, 214, 216 and 218 are replaced by a multilayer, general interconnection path 310 located within the optical train 312 of system 300. Processor 300 likewise comprises a gain medium 302, an optical coupler 304, a PCM 306, and a beam expander 308. Three consecutive SLMs 314, 316, and 318 provide the interconnection subsystem 310. The SLMs 314, 316, and 318 of subsystem 310 can be encoded to perform any function which can be carried out by processor 10 shown in FIG. 1, processor 100 shown in FIG. 6, and processor 200 shown in FIG. 7. As in the embodiment of FIG. 7, it is contemplated that in processor 300, a preferred path through the cavity is amplified at the expense other paths through the cavity. However, it is likewise contemplated that multiple paths can exist simultaneously.

Figure 9:
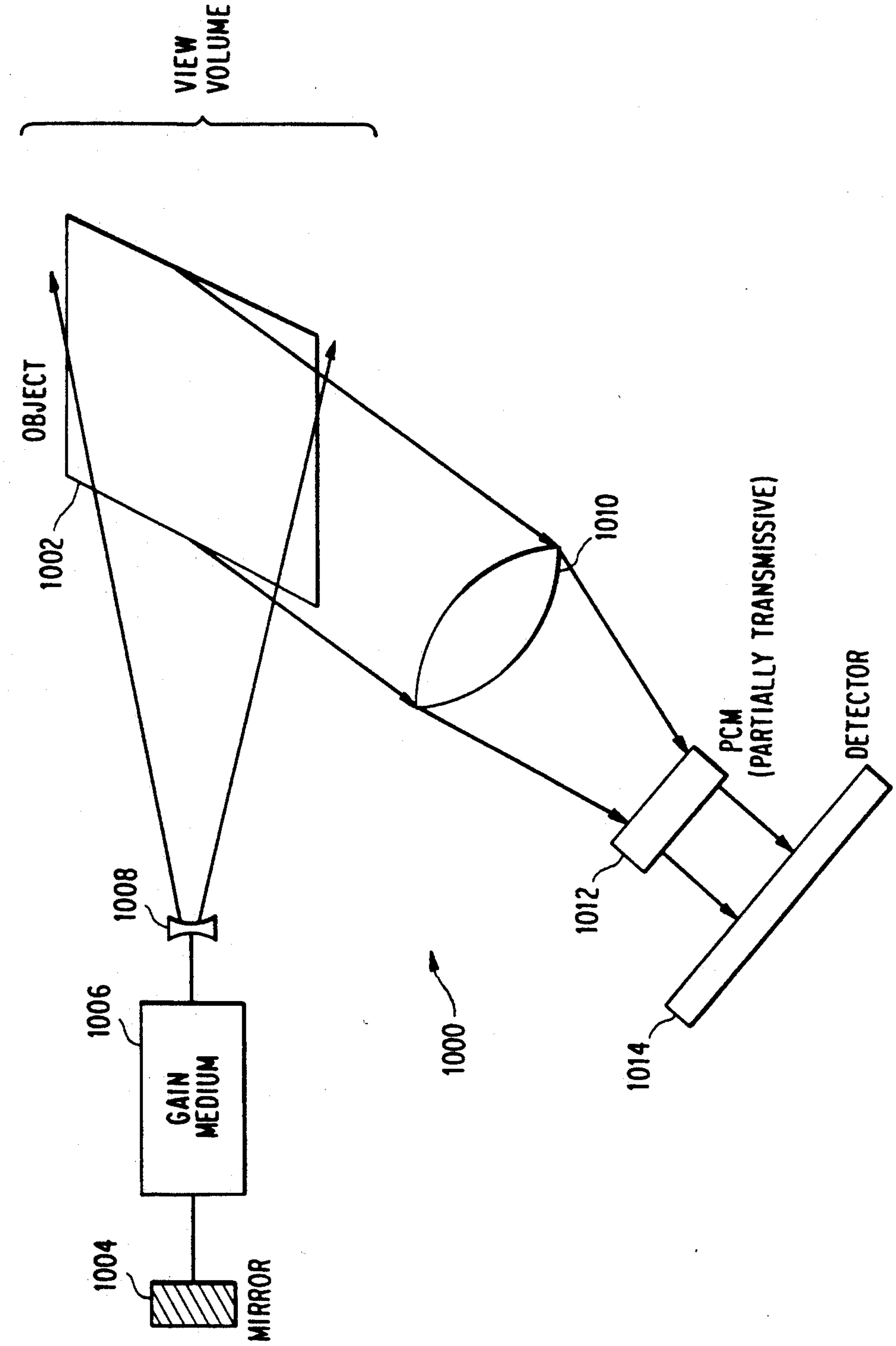
FIG. 9 is a schematic diagram of a preferred embodiment of an active multi-stable cavity sensor according to the present invention.

FIG. 9 is a schematic block diagram showing a first embodiment of the low energy, active, multi-stable cavity sensor in accordance with the present invention. Sensor 1000 is arranged with respect to an object or pattern 1002 under investigation in a view volume so as to form an active cavity which is capable of resonance. As will become clear from the following discussion, in the absence of the object or pattern 1002 under investigation, sensor 1000 is incapable of resonance, and thus the object or pattern itself provides an essential portion of the optical cavity for the sensor 1000.

The optical elements of sensor 1000 include a conventional mirror 1004 disposed proximate one end of a gain medium 1006. Beyond the other end of the gain medium, a fluorescence beam expanding lens 1008 is provided for fully illuminating the object 1002 with light generated by the gain medium 1006. Light reflected by the object 1002 is collected by a second lens member 1010 from which it is directed to a phase conjugate mirror (PCM) 1012. In the embodiment of FIG. 9, the PCM 1012 is made partially transmissive and so a photodetection arrangement 1014 is disposed behind the PCM.

Gain element 1006 likewise can comprise any conventional lasing cell and likewise, solid state laser diodes are preferred. Corresponding to the type of gain element chosen, any suitable pumping or exciting means can be provided for energizing the gain medium into a prelasing state of population inversion to produce fluorescence.

When the gain medium is excited into spontaneous emission, photons generally directed along the axial axis of the gain medium propagate through the lens 1008 to be focused into the view volume so that fluorescent light will illuminate the object 1002 under investigation therein. As soon as the spontaneously emitted photons from the gain medium 1006 are reflected by the object 1002, the wavefront defined by these photons acquires the information provided by the object. The object 1002 and its component shapes continuously perturb wavefronts defined by spontaneously emitted photons along the optical axis to produce a perturbed or encoded wavefront. In this way, the encoded wavefront could be made to carry information for recognization of the object 1002 by, for example, template matching techniques or feature extracting, or other information such as the range to the object or its structural properties.

Decoding of the perturbed wavefront is automatically carried out by the partially transmissive PCM 1012 which is positioned to receive a maximum amount of reflected light from the object 1002. The PCM 1012 likewise could comprise an array of independent, small reflecting members as illustrated in FIG. 2 to most strongly reflect the characteristic spatial pattern or patterns to be recognized in the view volume. If the perturbed wavefront formed by object 1002 substantially matches the characteristic wavefront pattern of PCM 1012, light defining the perturbed wavefront pattern is reflected back to the object by the PCM to carry correlation results back to the gain medium 1006. Correlation between the known spatial pattern and the spatial pattern to be investigated likewise produces gain or further stimulated emission in the medium 1006. The intensity amplified wavefront likewise is reflected by full mirror 1004 back through the gain medium 1006 to be further amplified with each subsequent iteration. Stimulated emission continues in this manner to produce resonant conditions within the cavity defined by the optical elements and the object under investigation.

As discussed in the foregoing, different criteria may be used in evaluating the correlation results as sensed by photodetection arrangement 24. The time sequence, the lobe structure, and spectral classification are all applicable methods for evaluation. Likewise, other methods such as measuring voltage and/or current across the gain medium 1006 are suitable.

Figure 10:
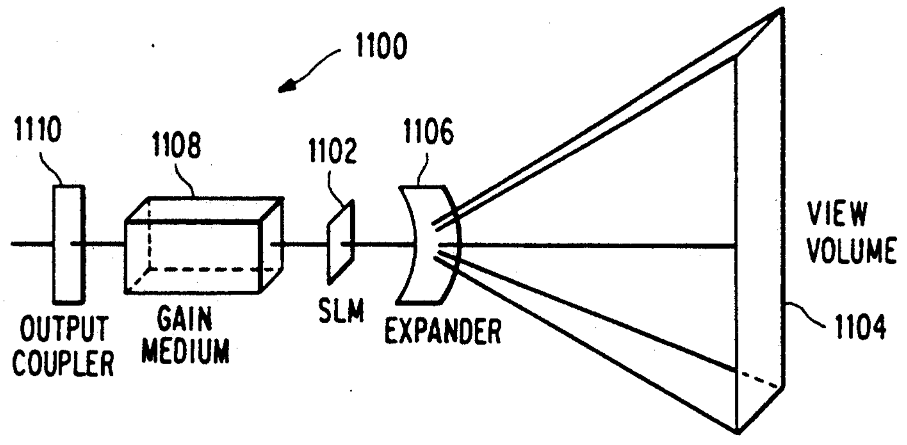
FIG. 10 is a schematic diagram of an alternative embodiment of an active multi-stable cavity sensor in accordance with the present invention.

Reference is made to FIG. 10 in describing an alternative embodiment of a sensor in accordance with the present invention. Sensor 1100 differs from sensor 1000 in that a spatial light modulator 1102 provides the pattern to be recognized in the view volume 1104. Light reflected from a pattern within the view volume is focussed back onto SLM 1102 by the beam expander 1106. A gain medium 1108 is provided between the SLM 1102 and an output coupler 1110. Output coupler 1110 may have, for example, a 2% transmittivity to provide a sensor output. When the encoded waveform is imaged onto the view volume, patterns within the view volume which correspond with the encoded pattern or patterns of the SLM 1102 will reflect light back through the SLM to reinforce the wavefront as it propagates back through the gain medium 1108 and to the output coupler 1110.

Figure 11:
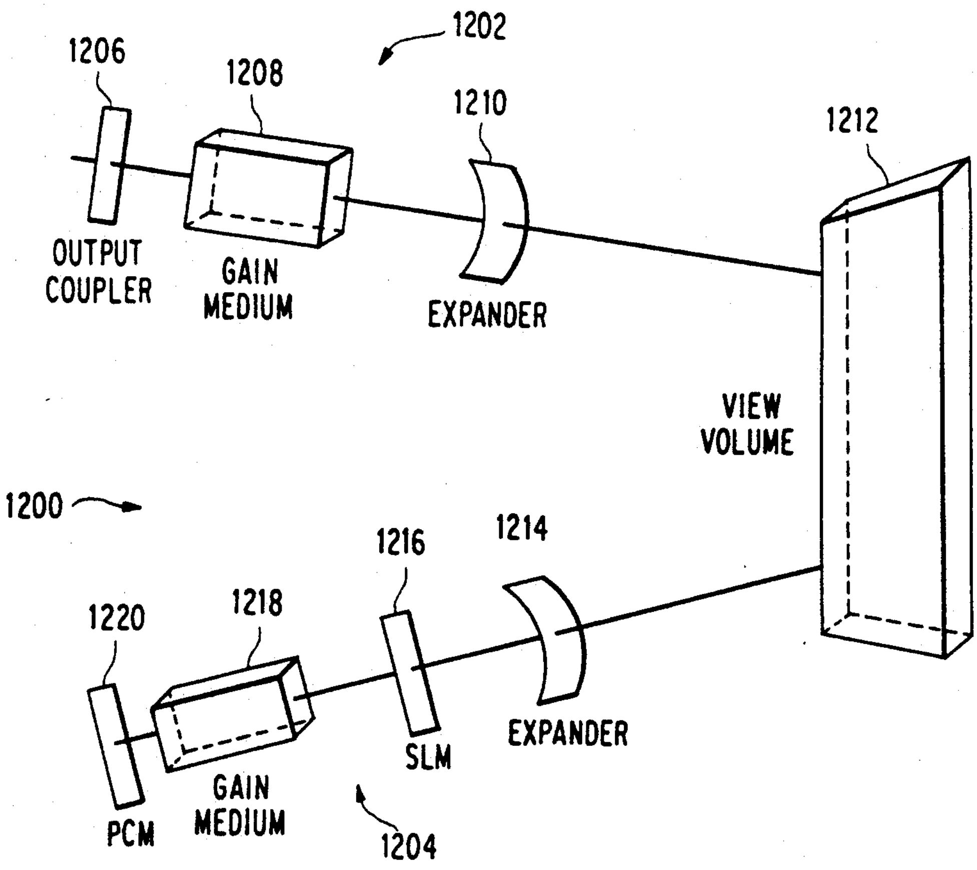
FIG. 11 is a schematic diagram of still another embodiment of the sensor according to the present invention.

FIG. 11 shows still another embodiment of the sensor in accordance with the present invention. The sensor 1200 of FIG. 11 comprises what may be referred to as a transmitting portion 1202 and a receiving portion 1204. The transmitting portion 1202 is defined by an output coupler 1206, a gain medium 1208 and a beam expander 1208. Spontaneous light from the gain medium 1208 likewise is directed by the beam expander 1210 into the view volume 1212. Objects within the viewed volume reflect incident light from the transmitter 1202 to a collecting lens 1214 of the receiver. The collecting lens 1214 focuses reflected light onto a transmissive SLM 1216 encoded with the pattern or patterns to be recognized. If there is correlation between the patterns encoded by the transmissive SLM 1216 and patterns within the view volume 1112, light indicative of the correlated patterns is transmitted through the SLM to a second gain medium 1218 which likewise is energized to a level of population inversion. Stimulated emission in the second gain medium 1218 is reflected by a PCM 1220 back through the gain medium to reinforce the correlation wavefront whereupon it is reflected back to the transmitter portion 1202 by means of the recognized pattern in the viewed volume.

In operation, in all of the preferred embodiments of the sensor, a correlation pattern is formed by reinforcing and cancelling perturbed wavefronts. Resonance will occur due to correlation paths through the active cavity defined by the sensor elements and the object under investigation. Resonant conditions will produce further stimulated emission in the gain medium, up to where the medium reaches depletion conditions, so that the number of stimulated emissions generated by the gain material will be proportional the amount of light directed back through the medium. Likewise, a dominant correlation path may establish a dominant resonant mode in the cavity, however, multiple modes also may build.

It is to be understood that there can be various changes and modifications to the preferred embodiments of the present invention disclosed herein, which changes and/or modifications may be made by one of ordinary skill in the art, but such would still result in a system well within the scope of the invention as set forth in the claims.

We claim:

1. Optical apparatus forming an optical cavity with an element to be investigated, said optical apparatus and said element to be investigated providing an optical sensor which indicates whether a given spatial pattern that is characteristic of said optical apparatus corresponds to a spatial pattern generated by the element when the optical cavity is formed by said optical apparatus, the element, and coherent light provided in said optical apparatus, said optical apparatus comprising:

a gain medium excitable at least into a state of fluorescence to spontaneously emit light which forms a wavefront that is spatially modulated by an element to be investigated to impose a spatial pattern representative of the element on said wavefront;

reflective means, located at one end of said optical cavity, for reflecting light propagating in said cavity under resonant conditions to pass back through said gain medium;

spatial light modulating means for modulating light incident thereon according to said characteristic spatial pattern of said optical apparatus and for permitting resonance within said cavity when the spatial pattern generated by the element to be investigated corresponds with said characteristic spatial pattern, whereby stimulated emission is produced by said gain medium, said spatial light modulation means preventing resonance within said cavity when the spatial pattern of the element to be investigated and said spatial pattern characteristic of said apparatus do not correspond; and lens means for focussing light incident on both the element and on said spatial light modulating means.

2. Optical apparatus as claimed in claim 1, wherein said spatial light modulating means comprises a phase conjugate mirror means.

3. Optical apparatus as claimed in claim 2, wherein said phase conjugate mirror means is partially transmissive and said apparatus further comprises a photodetector means disposed to receive light transmitted through said phase conjugate mirror means.

4. Optical apparatus as claimed in claim 2, wherein said phase conjugate mirror means comprises phase conjugating reflecting elements.

5. Optical apparatus as claimed in claim 1, wherein said spatial light modulating means comprises a transmissive spatial light modulator.

6. Optical apparatus as claimed in claim 5, wherein said lens means comprises a fluorescence beam expanding lens.

7. Optical apparatus as claimed in claim 1, further comprising a second gain medium.

8. Optical apparatus as claimed in claim 7, wherein said spatial light modulating means comprises a transmissive spatial light modulator disposed between the element and said second gain medium, and wherein said reflective means comprises an output coupling device disposed to reflect light back to said gain medium and a phase conjugate mirror disposed to reflect light back to said second gain medium.

9. A method of recognizing a spatial pattern generated by an element under investigation in a view volume by utilizing a spatial light modulating means which generates a characteristic spatial pattern, a gain medium, and a reflective means, said method comprising the steps of:

exciting said gain medium to induce fluorescence in said medium to thereby generate a spatially modulatable wavefront;

directing said wavefront to be incident on one of said spatial light modulating means and said element whereby said one of said spatial light modulating means and said element modulates said wavefront to provide a modulated wavefront;

directing said modulated wavefront to be incident on the other of said spatial light modulating means and said element, whereby said other of said spatial light modulating means and said element will (a) permit further propagation of at least a portion of said modulated wavefront when there is a correspondence between said spatial pattern generated by said element and said spatial pattern characteristic of said spatial light modulating means, or (b) substantially prevent further propagation of said modulated wavefront when there is substantially no correspondence between said spatial pattern generated by said element and said spatial pattern characteristic of said spatial light modulating means;

causing any portion of said modulated wavefront which is still propagating after incidence on said other of said spatial light modulating means and said element to be directed back to said gain medium by said reflective means; and detecting whether a portion of said modulated wavefront is still propagating after incidence on said other of said spatial light modulating means and said element by detecting whether stimulated emission is produced by said gain medium in response to said portion being directed thereto by said reflective means.

10. A method as claimed in claim 9, wherein said step of detecting comprises detecting resonance in a resonant cavity defined by said reflective means, said gain medium, said spatial light modulating means, and said element.

11. A method as claimed in claim 10, wherein said reflective means comprises phase conjugate reflective means.

12. A method as claimed in claim 10, wherein said step of detecting comprises determining photon arrival statistics in time.

13. A method as claimed in claim 10, wherein said step of detecting comprises determining a lobe structure of modes amplified in said cavity by stimulated emission in said gain medium.

14. A method as claimed in claim 10, wherein said step of detecting comprises determining spectral classifications of photons generated by stimulated emission in said gain medium.

15. A method as claimed in claim 9, wherein said method further comprises utilizing a second gain medium, and wherein said step of causing any portion of said modulated wavefront which is still propagating to be directed back to said gain medium comprises the step of causing said any portion of said modulated wavefront to be directed through said second gain medium before said portion is directed back to said gain medium.

* * * * *